Patented Jan. 11, 1938

2,105,326

UNITED STATES PATENT OFFICE 2,105,326

DYE SOLUTION

Eugene A. Markush, Jersey City, and Julius Miller, Newark, N. J., assignors to Pharma Chemical Corporation, New York, N. Y., a corporation of New York.

No Drawing. Application December 19, 1933, Serial No. 703,070

18 Claims. (Cl. 8—6)

Our invention relates to processes for the production of solutions of dye compositions and the solutions produced thereby, and refers particularly to processes for the production of stabilized clear solutions of dye compositions consisting of stabilized diazo compounds and coupling components and to the solutions thus produced.

Among the more important dye compositions are those formed by mixing a stabilized diazo compound in paste or dry form with a coupling compound, in paste or dry form, which is capable of combining with the diazo compound of the stabilized diazo compound, when the latter is broken down into its original constituents, thus forming a dye or coloring compound.

These dye compositions are of great value in that they may be applied to a textile fiber or fabric in either a paste form or in solution, and the dye produced upon the fiber by breaking down the composition upon the fiber or fabric into its original diazo compound and its combined stabilizing agent, the diazo compound combining with the coupling component to form the dye.

The application of these compositions, therefore, is much more simple in operation and results in brighter and purer shades than is possible when the diazo compound and the coupling compound are applied separately.

These dye compositions however possess one great disadvantageous attribute which it has thus far been unable to overcome.

It is well known that these dye compositions do not produce clear solutions due to the presence of gritty and other insoluble substances which produce spots and specks upon the treated fibers or fabrics.

It is further well known that even if these insoluble substances are removed by the most careful and effective filtering operations, a further production of insoluble substances results in the clear filtrate thus obtained and hence the filtering process is of no practical value.

It is evident that if the formation of these insoluble substances can be prevented, the solution of the dye composition will remain clear and uncontaminated and that the dyed results will be much more uniform and valuable than those produced from a paste or solution in which such insoluble materials are present.

Our invention relates to processes whereby this most desirable result can be obtained.

We have found that the presence of amino acids in a solution of a stabilized diazo compound and a coupling component prevents the formation of these insoluble chemical compounds, and hence enables the production of a clear stabilized solution of such dye compositions.

Among the amino acids suitable for employing in our process are acids from hydrolized proteins, glycine, lencine, cystine, phenyl-alanin and histidine, but we do not limit ourselves to these specified amino acids.

We have further found that the glycol-ethers have the property of retarding or preventing crystallization in the solution, and while the presence of these glycol-ethers is not necessary if sufficient dilution of the solution is employed, in actual practice, it is advisable to employ them.

Among the glycol-ethers adapted for use in our process are the following:—

Ethylene-glycol-monoethyl-ether,
Ethylene-glycol-monoethyl-ether acetate,
Ethylene-glycol-monobutyl-ether,
Ethylene-glycol-monomethyl-ether,
Diethylene-glycol-monoethyl-ether,
Diethylene-glycol-monobutyl-ether, but we do not limit ourselves to these specified glycol-ethers.

We have further found that urea has the property of accelerating the solution formation and hence we prefer to employ it, although its presence is not essential.

We give the following as examples of the process of our invention:

Example 1

The basic materials used are dianisidine-alpha-carboxy-pyrollidine and beta-hydroxynaphthoic acid-anilid. It is desirable that both these compounds shall be freshly precipitated before being submitted to the process of stabilization. The basic materials are prepared for stabilization in the following manner:

Dianisidine-alpha-carboxy-pyrollidine when obtained from the reaction (condensation of tetrazo-dianisidine and alpha-carboxy-pyrollidine) is a gummy or syrupy mass, by several recrystallizations a sandy technical pure product is obtained. However, it is significant that this product when subjected to the usual method of dissolving will yield a gummy precipitate consisting, not exactly, of the original material. The precise nature of this by-product is unknown to us, however, it does not possess the essential and valuable properties of diazo-amino compounds and has a disturbing effect in printing.

301 parts of the diazoamino compound, in paste form, are stirred with sufficient water to a fine paste, about 1000 parts of water being required. Preferably calcium free water and if possible distilled water should be used. A solution of sodium hydroxide 32° B. is then slowly added in a very fine stream. We have found that the temperature of the paste, the temperature of the hydroxide solution, as well as the temperature of the reaction mixture should preferably be not higher than 25° C., and not lower than 18° C. If kept between these limits clear solution is obtained. If the temperature is higher than 25° C., gummy substances are liable to result, while below 20° C., the solubilizing will be more difficult.

We then add 500 parts of hydrolized proteins. Simultaneously a solution of beta-hydroxy-naphthoic acidanilide is prepared by using 329 parts of it with 1400 parts of urea and sufficient water to produce a fine paste, then slowly at 25° C. a solution of sodium hydroxide 32° B. is added until a clear solution is obtained. This latter solution, which is filtered from all insoluble substances is then added in a fine stream to the solution of the diazoamino solution, also simultaneously an additional quantity of sodium hydroxide 32° B. until the mixture of the two solutions will contain 896 parts of the sodium hydroxide solution. When about one-half of the naphthoic acid compound solution has been added; 665 lbs. of diethylene-glycol-monethylether should be added with constant stirring. When all of the above ingredients have been added the mixture is heated to 50° C. and filtered through an asbestos medium.

Sufficient water is now added to make a total of 3000 parts of water. The solution can be standardized to the desired percentage with either water or the ether.

*Example 2*

1 mole weight of methoxy-o-diphenyl-ether-diazo-amino-sulfo-benzol-carboxylic acid is treated in conjunction with one mole of beta-hydroxy-naphthoic acid-ortho-anisidid and 800 parts of urea, 600 parts of water, 200 parts of glycine, 184 parts diethylene-glycol-monethyl-ether.

The physical conditions and manipulations are similar to those applied in Example 1.

*Example 3*

1 mole part 2.3-hydroxy-naphthoic acid anilide (obtained in paste form from the reaction) are mixed with 225 parts sodium hydroxide 32° B. and heated mildly, and sufficient water added until a clear solution is obtained. On the other hand a paste of nitrosamine salts of meta-nitro-para-toluidine is stirred into above mixture and the so obtained thin paste treated with 1 mole of caustic soda (32° B.) then sufficient quantity of diethylene-glycol-monethyl-ether and the required quantity of phenyl-alanin are added.

The solution is filtered and standardized by an additional quantity of ether.

It is not necessary to add the amino acids, the sodium hydroxide and the glycol-ethers in the exact steps of procedure as specified above, as they may be added otherwise during the process with the production of equally satisfactory results.

By "stabilized clear solution" we mean a clear solution of the dye compositions included within our specification in which insoluble compounds will not form upon standing.

One or more amino acids and one or more glycol-ethers may be employed in our process, and the term "amino acid" and "glycol-ether" as they appear in our claims are intended to mean one or more of these groups of chemicals.

It is evident, therefore, that our invention presents a great advance in the employment and application of the dye compositions consisting of stabilized diazo compounds and coupling components.

What we claim is:—

1. A process for producing a stabilized clear solution of dye compositions which comprises adding an amino acid to a solution of a dye composition consisting of a stabilized diazo compound and a coupling component.

2. A process for producing a stabilized clear solution of dye compositions which comprises adding an amino acid obtainable by hydrolizing a protein to a solution of a dye composition consisting of a stabilized diazo compound and a coupling component.

3. A process for producing a stabilized clear solution of dye compositions which comprises adding an amino acid and a glycol-ether to a solution of a dye composition consisting of a stabilized diazo compound and a coupling component.

4. A process for producing a stabilized clear solution of dye compositions which comprises adding an amino acid obtainable by hydrolizing a protein and a glycol-ether to a solution of a dye composition consisting of a stabilized diazo compound and a coupling component.

5. A process for producing a stabilized clear solution of dye compositions which comprises adding an amino acid and diethylene-glycol-monoethyl-ether to a solution of a dye composition consisting of a stabilized diazo compound and a coupling component.

6. A process for producing a stabilized clear solution of dye compositions which comprises adding an animo acid obtainable by hydrolizing a protein and diethylene-glycol-monethyl-ether to a solution of a dye composition consisting of a stabilized diazo compound and a coupling component.

7. A process for producing a stabilized clear aqueous solution of dye compositions which comprises adding urea to a solution of a dye composition consisting of a stabilized diazo compound and a coupling component.

8. A process for producing a stabilized clear aqueous solution of dye compositions which comprises adding urea and a glycol-ether to a solution of a dye composition consisting of a stabilized diazo compound and a coupling component.

9. A process for producing a stabilized clear aqueous solution of dye compositions which comprises adding urea and diethylene-glycol-monoethyl-ether to a solution of a dye composition consisting of a stabilized diazo compound and a coupling component.

10. As a new dye composition, a stabilized clear solution of a stabilized diazo compound, a coupling component and an amino acid.

11. As a new dye composition, a stabilized clear solution of a stabilized diazo compound, a coupling component and an amino acid obtainable by hydrolyzing a protein.

12. As a new dye composition, a stabilized clear solution of a stabilized diazo compound, a coupling component and an amino acid and a glycol-ether.

13. As a new dye composition, a stabilized clear solution of a stabilized diazo compound, a coupling component and an amino acid obtainable by hydrolyzing a protein and a glycol-ether.

14. As a new dye composition, a stabilized clear solution of a stabilized diazo compound, a coupling component and an amino acid and diethylene-glycol-monethyl-ether.

15. As a new dye composition, a stabilized clear solution of a stabilized diazo compound, a coupling component and an amino acid obtainable by hydrolyzing a protein and diethylene-glycol-mono-ethyl-ether.

16. As a new dye composition, a stabilized clear aqueous solution of a stabilized diazo compound, a coupling component and urea.

17. As a new dye composition, a stabilized clear aqueous solution of a stabilized diazo compound, a coupling component and urea and a glycol-ether.

18. As a new dye composition, a stabilized clear aqueous solution of a stabilized diazo compound, a coupling component and urea and diethylene-glycol-monoethyl-ether.

EUGENE A. MARKUSH.
JULIUS MILLER.